US007352667B2

(12) United States Patent
Hsu et al.

(10) Patent No.: US 7,352,667 B2
(45) Date of Patent: Apr. 1, 2008

(54) OPTICAL DISC DRIVE WITH A SYSTEM BEHAVIOR DETECTION MODULE

(75) Inventors: Chih-Chin Hsu, Taipei Hsien (TW); Hsiang-Ji Hsieh, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 779 days.

(21) Appl. No.: 10/947,562

(22) Filed: Sep. 22, 2004

(65) Prior Publication Data

US 2005/0099903 A1 May 12, 2005

(30) Foreign Application Priority Data

Nov. 6, 2003 (TW) .............................. 92131099 A

(51) Int. Cl.
*G11B 7/00* (2006.01)

(52) U.S. Cl. ............................... 369/44.35; 369/44.29; 369/30.22

(58) Field of Classification Search ............... 369/30.1, 369/30.11, 30.21, 30.22, 30.24, 30.18, 30.36, 369/44.34, 44.35, 44.29, 44.27, 53.35
See application file for complete search history.

(56) References Cited

U.S. PATENT DOCUMENTS 6,741,529 B1 * 5/2004 Getreuer .................. 369/30.17

* cited by examiner

*Primary Examiner*—Ali Neyzari
(74) *Attorney, Agent, or Firm*—Thomas, Kayden, Horstemeyer & Risley

(57) ABSTRACT

An optical disc drive includes a servo system and a system behavior detection module. The system behavior detection module includes a controller and a signal feeding unit coupled to the controller and the servo system. The controller is operable in a detection mode and in a normal operation mode. In the detection mode, the controller enables the signal feeding unit so as to introduce an exciting signal into the servo system. In the normal operation mode, the controller disables the signal feeding unit so as to inhibit introduction of the exciting signal into the servo system.

23 Claims, 3 Drawing Sheets

ES
3
2
4
361 4211 42 4213 IS 33 34 31 32
4221 adder circuit IS' compensator CS driver unit optical pickup unit DS amplifier
XS 422 4212 4222 423 421 RS 363 362
461 46 signal generator 462 controller 41
431 4312 4411 441 44
4311 first selecting member gain calculating unit 4412 memory device 45
second selecting member 4322 phase calculating unit
4321 432 43 4421 442 4422
433 443

OPTICAL DISC DRIVE WITH A SYSTEM BEHAVIOR DETECTION MODULE

CROSS-REFERENCE TO RELATED APPLICATION

This application claims priority of Taiwanese application no. 092131099, filed on Nov. 6, 2003.

BACKGROUND OF THE INVENTION

1. Field of the Invention

The invention relates to an optical disc drive, more particularly to an optical disc drive with a system behavior detection module.

2. Description of the Related Art

As illustrated in FIGS. 1 and 2, a conventional optical disc drive comprises a servo system that includes an optical pickup unit 11, an amplifier (or pre-amplifier) 12 coupled to the optical pickup unit 11, a compensator 13 coupled to the amplifier 12, and a driver unit 14 coupled to the optical pickup unit 11 and the compensator 13.

The conventional optical disc drive further includes a controller chip (not shown). The amplifier 12 and the compensator 13 are normally built into the controller chip.

In operation, the optical pickup unit 11 emits light that is reflected by an optical disc (not shown). The reflected light is detected by the optical pickup unit 11, which responds by providing a detected signal (DS) corresponding to the reflected light. The amplifier 12 receives the detected signal (DS) and provides an error signal (ES), such as a track error or focus error signal, corresponding to the detected signal (DS). The compensator 13 receives the error signal (ES) and a reference signal (RS), and provides a control signal (CS) corresponding to the error signal (ES) and the reference signal (RS). The driver unit 14 receives the control signal (CS) and drives movement of the optical pickup unit 11, i.e., movement of an object lens (not shown) of the optical pickup unit 11, in accordance to the control signal (CS), thereby resulting in correction of the focusing and tracking of the light emitted by the optical pickup unit 11.

In order for the driver unit 14 to drive movement of the optical pickup unit 11 so that the light emitted by the optical pickup unit 11 can be accurately focused on the tracks on the optical disc, the compensator 13 must be designed based on the behavior of the servo system during the development stage of the optical disc drive.

A conventional method for detecting the behavior of the servo system comprises the following steps of cutting the electrical connection between the compensator 13 and the driver unit 14, connecting an adder circuit 15 between the compensator 13 and the driver unit 14, using a dynamic system analyzer 20 to introduce an exciting signal (XS), such as a variable frequency sinusoidal signal, into the servo system through the adder circuit 15, using the system analyzer 20 to obtain output and input signals from a junction 161 of the compensator 13 and the adder circuit 15, and a junction 162 of the adder circuit 15 and the driver unit 14, and using the system analyzer 20 to calculate gain and phase relationships between the input and output signals. The gain and phase relationships calculated by the system analyzer 20 can then be used as parameters in designing the compensator 13.

Although the above-mentioned method achieves the purpose of detecting the behavior of the servo system, the alteration of the circuitry of the servo system to connect the adder circuit 15 may arise in interference to the exciting signal (XS). As a result, the resulting calculation of the gain and phase relationships may not be accurate. Furthermore, the system analyzer 20 is not economically practical for this purpose due to its high cost.

SUMMARY OF THE INVENTION

Therefore, the main object of the present invention is to provide an optical disc drive with a built-in system behavior detection module.

Another object of the invention is to provide a system behavior detection module for an optical disc drive.

According to one aspect of the present invention, an optical disc drive comprises a servo system and a system behavior detection module. The servo system includes an optical pickup unit for generating a detected signal, an amplifier coupled to the optical pickup unit for generating an error signal associated with the detected signal, a compensator for processing the error signal to result in a control signal, and a driver unit coupled to the optical pickup unit and responsive to the control signal for position correction of the optical pickup unit. The system behavior detection module includes a controller and a signal feeding unit coupled to the controller and the servo system. The controller is operable in a detection mode. In this mode, the controller enables the signal feeding unit so as to introduce an exciting signal into the servo system. The controller is further operable in a normal operation mode. In this mode, the controller disables the signal feeding unit so as to inhibit introduction of the exciting signal into the servo system.

According to another aspect of the present invention, a system behavior detection module for an optical disc drive comprises a controller and a signal feeding unit. The optical disc drive has a servo system that includes an optical pickup unit for generating a detected signal, an amplifier coupled to the optical pickup unit for generating an error signal associated with the detected signal, a compensator for processing the error signal to result in a control signal, and a driver unit coupled to the optical pickup unit and responsive to the control signal for position correction of the optical pickup unit. The signal feeding unit is coupled to the controller and is adapted to be coupled to the servo system. The controller is operable in a detection mode. In this mode, the controller enables the signal feeding unit so as to introduce an exciting signal into the servo system. The controller is further operable in a normal operation mode. In this mode, the controller disables the signal feeding unit so as to inhibit introduction of the exciting signal into the servo system.

BRIEF DESCRIPTION OF THE DRAWINGS

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
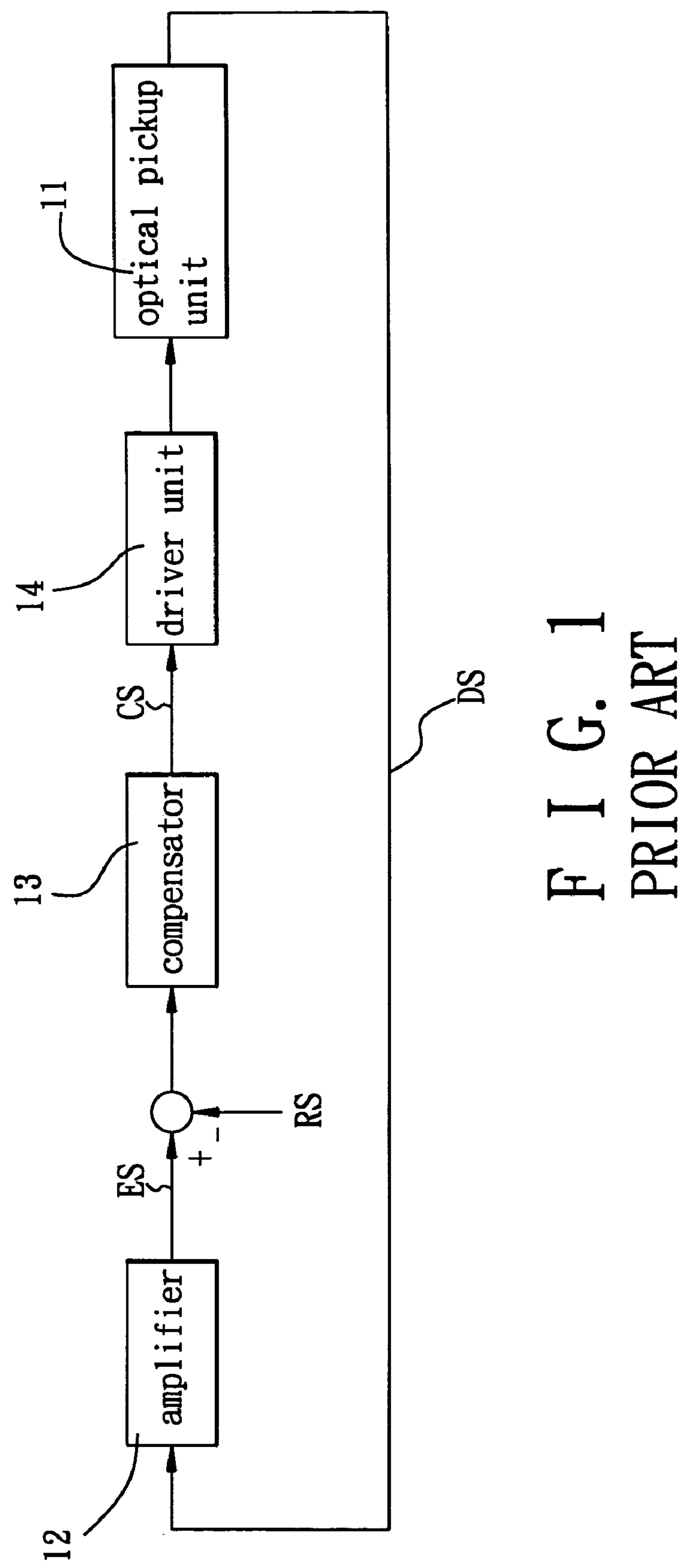
FIG. 1 is a schematic circuit block diagram of a servo system of a conventional optical disc drive.
Figure 2:
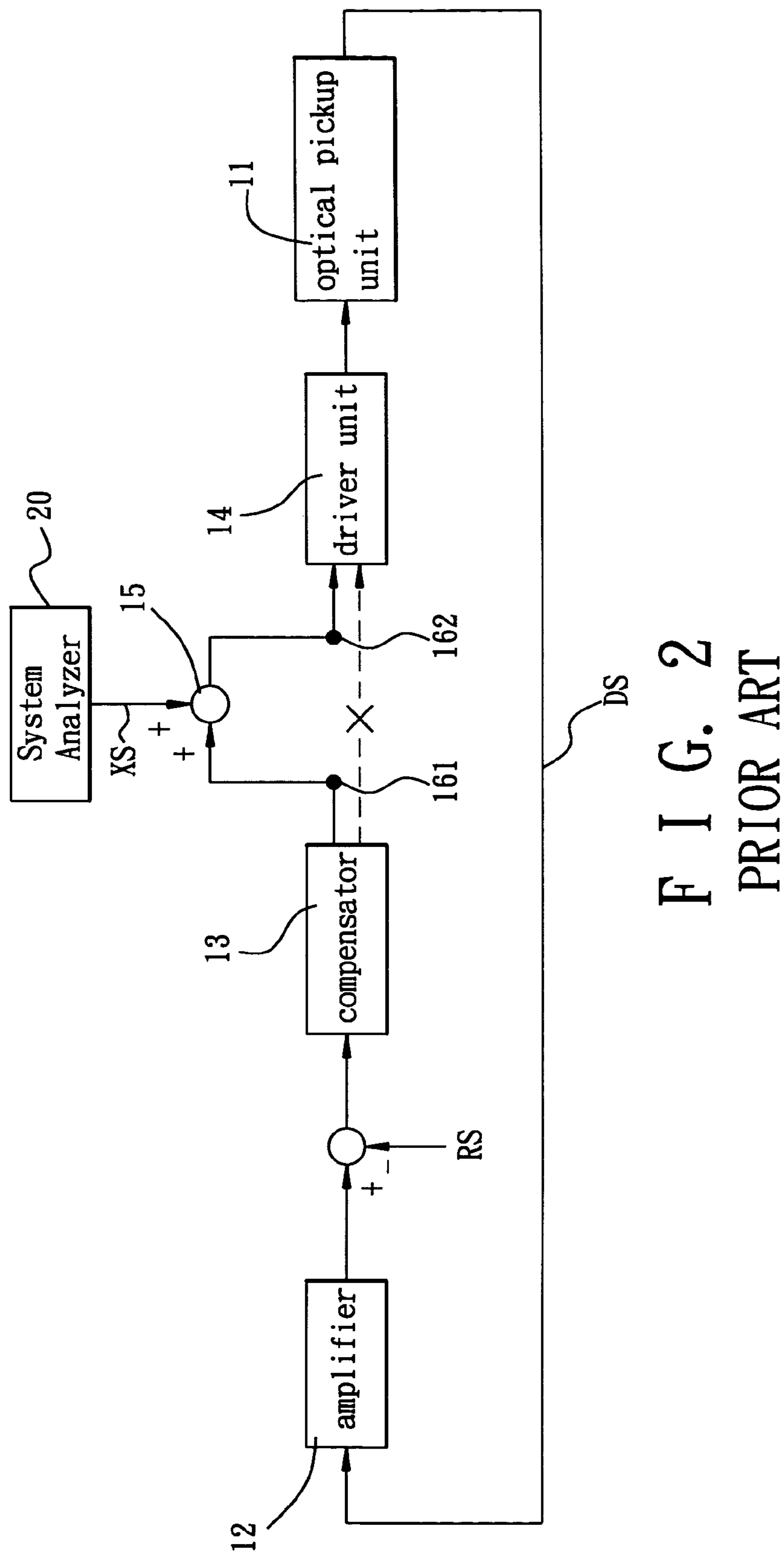
FIG. 2 is a schematic circuit block diagram to illustrate an adder circuit coupled to the servo system of FIG. 1.
Figure 3:
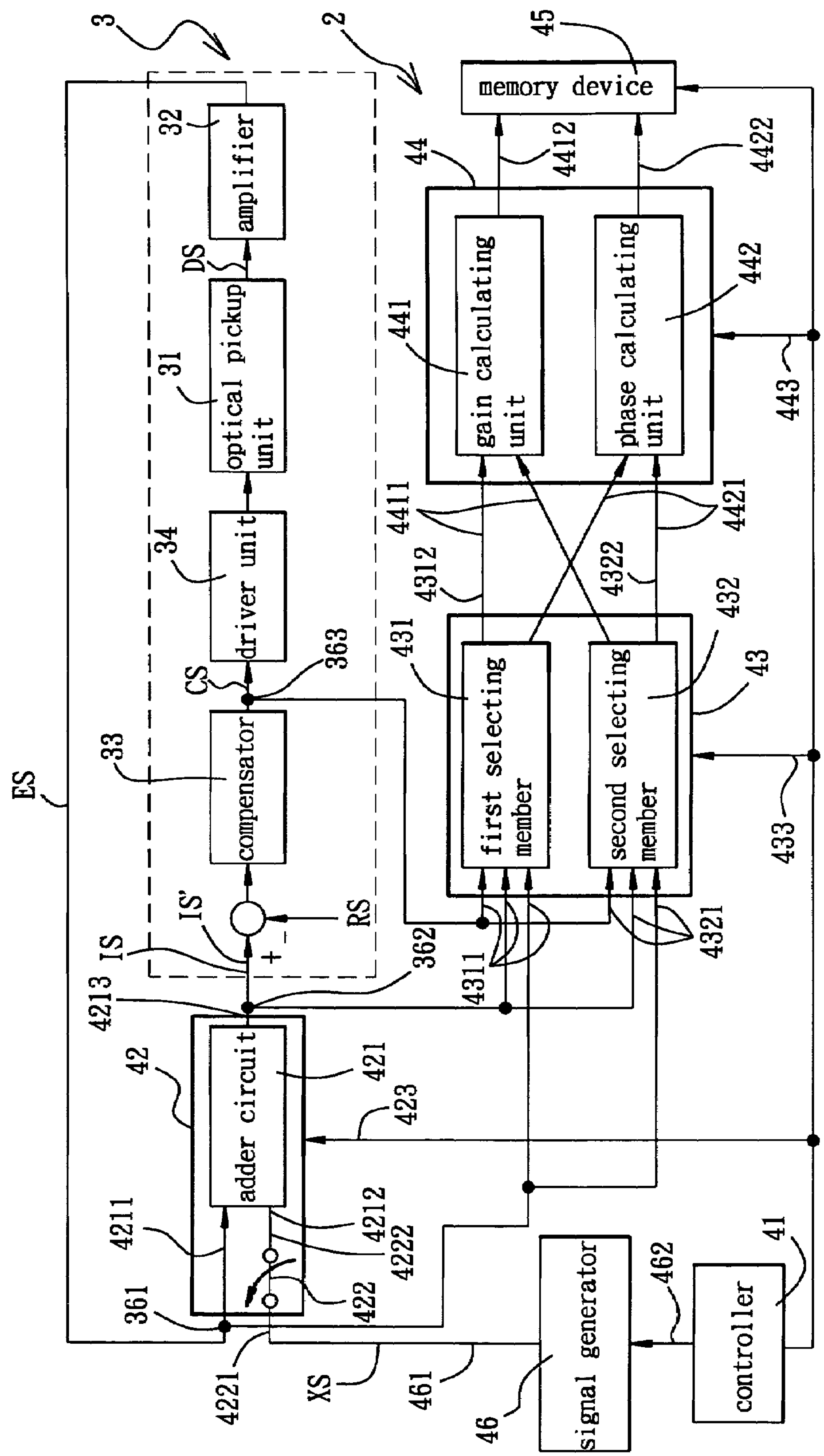
FIG. 3 is a schematic circuit block diagram of the preferred embodiment of an optical disc drive according to the present invention.

Referring to FIG. 3, the preferred embodiment of an optical disc drive according to this invention is shown to include a servo system 3 and a system behavior detection module 4. It is noted herein that the optical disc drive actually includes other known components, such as a spindle motor, decoders, etc., not illustrated herein for the sake of simplicity.

The servo system 3 is conventional in construction, and includes an optical pickup unit 31, an amplifier (or pre-amplifier) 32 coupled to the optical pickup unit 31, a compensator 33, and a driver unit 34 coupled to the optical pickup unit 31 and the compensator 33.

In this embodiment, the system behavior detection module 4 includes a controller 41 and a signal feeding unit 42. The signal feeding unit 42 is coupled to the controller 41 and the servo system 3. In particular, the signal feeding unit 42 is coupled to and is disposed between the amplifier 32 and the compensator 33. More particularly, the signal feeding unit 42 includes adder and switch circuits 421, 422, and has a control input 423 connected electrically to the controller 41. The adder circuit 421 has a first input 4211 coupled to the amplifier 32, a second input 4212 for receiving an exciting signal (XS), and an output 4213 coupled to the compensator 33. The switch circuit 422 has a first terminal 4221, and a second terminal 4222 coupled to the second input 4212 of the adder circuit 421.

Although the signal feeding unit 42 of this embodiment is coupled to and is disposed between the amplifier 32 and the compensator 33, it should be apparent to those skilled in the art that the signal feeding unit 42 may be coupled to and disposed anywhere in the servo system 3 as long as the exciting signal (XS) can be introduced into the servo system 3 when the controller 41 operates in a detection mode (to be described hereinafter). For example, the signal feeding unit 42 may be coupled to and disposed between the compensator 33 and the driving unit 34.

It is noted that the exciting signal (XS) is a sinusoidal waveform, the parameters (e.g. frequency, offset voltage, amplitude, etc.) of which are set by the user.

The system behavior detection module 4 further includes a signal generator 46 coupled to the signal feeding unit 42 and the controller 41. In particular, the signal generator 46 has an output 461 connected electrically to the first terminal 4221 of the switch circuit 422, and a control input 462 connected electrically to the controller 41.

In this embodiment, the controller 41 is operable in a normal operation mode and in a detection mode. In the normal operation mode, the controller 41 controls the switch circuit 422 such that the first terminal 4221 is disconnected from the second terminal 4222 so as to disable receipt of the exciting signal (XS) by the adder circuit 421. As a result, the adder circuit 421 of the signal feeding unit 42 is inhibited from introducing the exciting signal (XS) into the servo system 3. Preferably, the controller 41 disables the signal generator 46 so as to inhibit provision of the exciting signal (XS) to the signal feeding unit 42. As a consequence, during operation of the optical disc drive, the optical pickup unit 31 emits light, processes light reflected from an optical disc (not shown), and generates a detected signal (DS) corresponding to the reflected light. The amplifier 32 then generates an error signal (ES) associated with the detected signal (DS) in a known manner. The adder circuit 421 of the signal feeding unit 42 receives and provides an intermediate signal (IS) corresponding to the error signal (ES). The compensator 33 receives the intermediate signal (IS) and a reference signal (RS), and processes the intermediate signal (IS) and the reference signal to result in a control signal (CS) corresponding to the error signal (ES) and the reference signal (RS). The driver unit 34 is responsive to the control signal (CS) for position correction of the optical pickup unit 31 in a known manner.

In the detection mode, the controller 41 enables the signal generator 46 so as to provide the exciting signal (XS) to the signal feeding unit 42, and controls the switch circuit 422 such that the first terminal 4221 is connected to the second terminal 4222 so as to enable receipt of the exciting signal (XS) by the adder circuit 421. At this time, the adder circuit 421 of the signal feeding unit 42 is able to introduce the exciting signal (XS) into the servo system 3. As a consequence, during operation of the optical disc drive, the adder circuit 421 of the signal feeding unit 42 receives both the error and exciting signals (ES, XS), introduces the exciting signal (XS) into the error signal (ES), and provides an intermediate signal (IS') corresponding to the exciting and error signals (XS, ES).

The system behavior detection module 4 further includes a calculating circuit 44 coupled to the servo system 3 and the controller 41. In this embodiment, the calculating circuit 44 is controlled by the controller 41 so as to capture input and output signals in the servo system 3, and so as to calculate gain and phase relationships between the input and output signals when the controller 41 operates in the detection mode. In particular, the calculating circuit 44 includes gain and phase calculating units 441, 442, and has a control input 443 connected electrically to the controller 41. Each of the gain and phase calculating units 441, 442 has an input side 4411, 4421 coupled to the servo system 3, and an output side 4412, 4422. The gain calculating unit 441 calculates the gain relationship between the input and output signals, whereas the phase calculating unit 442 calculates the phase relationship between the input and output signals.

In this embodiment, each of the input and output signals is obtained from one of a first junction 361 of the amplifier 32 and the signal feeding unit 42, a second junction 362 of the signal feeding unit 42 and the compensator 33, and a third junction 363 of the compensator 33 and the driver unit 34. It is noted that the input and output signals must be obtained from two different junctions 361, 362, 363 at any given time.

The system behavior detection module 4 further includes a selector circuit 43 coupled to the servo system 3 and the controller 41. In this embodiment, the selector circuit 43 is controlled by the controller 41 so as to obtain the input and output signals from selected ones of the first, second and third junctions 361, 362, 363, and so as to provide the input and output signals to the calculating circuit 44 when the controller 41 operates in the detection mode. In particular, the selector circuit 43 includes first and second selecting members 431, 432, and has a control input 433 connected electrically to the controller 41. Each of the first and second selecting members 431, 432 has an input side 4311, 4321 connected electrically to the first, second and third junctions 361, 362, 363, and an output side 4312, 4322 connected electrically to the input side 4411, 4421 of a respective one of the gain and phase calculating units 441, 442 of the calculating circuit 44. The first selecting member 431 of the selector circuit 43 provides the input signal to each of the gain and phase calculating units 441, 442 of the calculating circuit 44, whereas the second selecting member 432 provides the output signal to each of the gain and phase calculating units 441, 442 of the calculating circuit 44.

The system behavior detection module 4 further includes a memory device 45 coupled to the calculating circuit 44 and the controller 41. In this embodiment, the memory device 45 is controlled by the controller 41 so as to store the gain and phase relationships calculated by the calculating circuit 44 when the controller 41 operates in the detection mode. Preferably, the memory device 41 is a dynamic random access memory (DRAM).

In this embodiment, the system behavior detection module 4 is incorporated together with the amplifier 32 and the compensator 33 in a single integrated controller chip. It is noted that a computing device (not shown) may be externally connected to the controller chip to extract the stored calculated gain and phase relationships for performing behavioral analysis of the servo system 3.

In an alternative embodiment, the signal generator 46 is dispensed with. The controller chip is provided with an input pin coupled to the first terminal 4221 of the switch circuit 422. An external signal generator (not shown) is connected to the input pin of the controller chip for providing the exciting signal (XS) when the controller 41 operates in the detection mode.

In yet another alternative embodiment, the selector circuit 43, the calculating circuit 44, and the memory device 45 are dispensed with. The controller chip is provided with first, second and third output pins coupled to the first, second and third junctions 361, 362, 363, respectively. An external calculating device (not shown) is connected to the first, second and third output pins for calculating the gain and phase relationships between the selected input and output signals when the controller 41 operates in the detection mode.

It has thus been shown that the optical disc drive of this invention includes a servo system 3 and a system behavior detection module 4. The servo system 3 includes a compensator 33 and an amplifier 32. The system behavior detection module 4 includes a signal feeding unit 42 that is incorporated together with the compensator 33 and the amplifier 32 in a controller chip. As such, an exciting signal (XS) can be conveniently introduced into the servo system 3 without the problem of interference during behavior detection. Moreover, the system behavior detection module 4 further includes a calculating circuit 44 for capturing input and output signals and for calculating gain and phase relationships between the input and output signals, and a memory device 45 for storing the calculated gain and phase relationships. By simply connecting an external computing device to the controller chip, the calculated gain and phase relationships can be extracted for further analysis. As such, there is no need for an expensive system analyzer. Further, since the controller chip per se already includes the selector circuit 43, the calculating circuit 44, the memory device 45, and the signal generator 46, the system behavior detection module 4 can be implemented in an existing servo system by mere addition of the signal feeding unit 42. As such, the system behavior detection module 4 can be implemented at a relatively low cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical disc drive comprising:

a servo system including an optical pickup unit for generating a detected signal, an amplifier coupled to said optical pickup unit for generating an error signal associated with the detected signal, a compensator for processing the error signal to result in a control signal, and a driver unit coupled to said optical pickup unit and responsive to the control signal for position correction of said optical pickup unit; and a system behavior detection module including a controller and a signal feeding unit coupled to said controller and said servo system, said controller being operable in a detection mode, wherein said controller enables said signal feeding unit so as to introduce an exciting signal into said servo system, said controller being further operable in a normal operation mode, wherein said controller disables said signal feeding unit so as to inhibit introduction of the exciting signal into said servo system.

2. The optical disc drive as claimed in claim 1, wherein said signal feeding unit is coupled to and is disposed between said amplifier and said compensator, said signal feeding unit introducing the exciting signal into the error signal when enabled.

3. The optical disc drive as claimed in claim 2, wherein said signal feeding unit includes:

an adder circuit having a first input coupled to said amplifier, a second input for receiving the exciting signal, and an output coupled to said compensator; and a switch circuit coupled to said second input of said adder circuit and controlled by said controller so as to enable and disable selectively receipt of the exciting signal by said adder circuit.

4. The optical disc drive as claimed in claim 1, wherein said system behavior detection module further includes a calculating circuit coupled to said servo system and said controller for capturing input and output signals in said servo system and for calculating gain and phase relationships between the input and output signals when said controller operates in the detection mode.

5. The optical disc drive as claimed in claim 4, wherein said system behavior detection module further includes a memory device coupled to said calculating circuit for storage of the gain and phase relationships calculated by said calculating circuit.

6. The optical disc drive as claimed in claim 4, wherein the input and output signals are obtained at a junction of said amplifier and said signal feeding unit, and at a junction of said signal feeding unit and said compensator, respectively.

7. The optical disc drive as claimed in claim 4, wherein each of the input and output signals is obtained from one of a first junction of said amplifier and said signal feeding unit, a second junction of said signal feeding unit and said compensator, and a third junction of said compensator and said driver unit.

8. The optical disc drive as claimed in claim 7, wherein said system behavior detection module further includes a selector circuit having an input side connected electrically to the first, second and third junctions, an output side connected electrically to said calculating circuit, and a control input connected electrically to said controller, said selector circuit being controlled by said controller so as to obtain the input and output signals from selected ones of the first, second and third junctions and so as to provide the input and output signals to said calculating circuit when said controller operates in the detection mode.

9. The optical disc drive as claimed in claim 8, wherein said calculating circuit includes:

a gain calculating unit for calculating the gain relationship between the input and output signals; and a phase calculating unit for calculating the phase relationship between the input and output signals.

10. The optical disc drive as claimed in claim 9, wherein said selector circuit includes:

a first selecting member for providing one of the input and output signals to each of said gain and phase calculating units; and a second selecting member for providing the other of the input and output signals to each of said gain and phase calculating units.

11. The optical disc drive as claimed in claim 1, wherein said system behavior detection module further includes a signal generator coupled to said signal feeding unit and said controller, said controller enabling said signal generator to provide the exciting signal to said signal feeding unit when said controller operates in the detection mode.

12. The optical disc drive as claimed in claim 1, wherein said system behavior detection module is incorporated together with said compensator in a single integrated circuit chip.

13. A system behavior detection module for an optical disc drive having a servo system that includes an optical pickup unit for generating a detected signal, an amplifier coupled to the optical pickup unit for generating an error signal associated with the detected signal, a compensator for processing the error signal to result in a control signal, and a driver unit coupled to the optical pickup unit and responsive to the control signal for position correction of the optical pickup unit, said system behavior detection module comprising a controller and a signal feeding unit coupled to said controller and adapted to be coupled to the servo system, said controller being operable in a detection mode, wherein said controller enables said signal feeding unit so as to introduce an exciting signal into the servo system, said controller being further operable in a normal operation mode, wherein said controller disables said signal feeding unit so as to inhibit introduction of the exciting signal into the servo system.

14. The system behavior detection module as claimed in claim 13, wherein said signal feeding unit is adapted to be coupled to and disposed between the amplifier and the compensator so as to introduce the exciting signal into the error signal when enabled.

15. The system behavior detection module as claimed in claim 14, wherein said signal feeding unit includes:

an adder circuit having a first input for receiving the error signal, a second input for receiving the exciting signal, and an output adapted to be coupled to the compensator; and a switch circuit coupled to said second input of said adder circuit and controlled by said controller so as to enable and disable selectively receipt of the exciting signal by said adder circuit.

16. The system behavior detection module as claimed in claim 13, further comprising a calculating circuit coupled to said controller and adapted to be coupled to the servo system for capturing input and output signals in the servo system and for calculating gain and phase relationships between the input and output signals when said controller operates in the detection mode.

17. The system behavior detection module as claimed in claim 16, further comprising a memory device coupled to said calculating circuit for storage of the gain and phase relationships calculated by said calculating circuit.

18. The system behavior detection module as claimed in claim 16, wherein the input and output signals are obtained at a junction of the amplifier and said signal feeding unit, and at a junction of said signal feeding unit and the compensator, respectively.

19. The system behavior detection module as claimed in claim 16, wherein each of the input and output signals is obtained from one of a first junction of the amplifier and said signal feeding unit, a second junction of said signal feeding unit and the compensator, and a third junction of the compensator and the driver unit.

20. The system behavior detection module as claimed in claim 19, further comprising a selector circuit having an input side connected electrically to the first, second and third junctions, an output side connected electrically to said calculating circuit, and a control input connected electrically to said controller, said selector circuit being controlled by said controller so as to obtain the input and output signals from selected ones of the first, second and third junctions and so as to provide the input and output signals to said calculating circuit when said controller operates in the detection mode.

21. The system behavior detection module as claimed in claim 20, wherein said calculating circuit includes:

a gain calculating unit for calculating the gain relationship between the input and output signals; and a phase calculating unit for calculating the phase relationship between the input and output signals.

22. The system behavior detection module as claimed in claim 21, wherein said selector circuit includes:

a first selecting member for providing one of the input and output signals to each of said gain and phase calculating units; and a second selecting member for providing the other of the input and output signals to each of said gain and phase calculating units.

23. The system behavior detection module as claimed in claim 13, further comprising a signal generator coupled to said signal feeding unit and said controller, said controller enabling said signal generator to provide the exciting signal to said signal feeding unit when said controller operates in the detection mode.

* * * * *